United States Patent [19]

Overbury

[11] 3,893,118
[45] July 1, 1975

[54] DOPPLER ILS RECEIVER
[75] Inventor: Francis Gile Overbury, Cuffley, England
[73] Assignee: International Standard Electric Corporation, New York, N.Y.
[22] Filed: July 26, 1973
[21] Appl. No.: 382,957

[30] Foreign Application Priority Data
Aug. 3, 1972 United Kingdom............... 36231/72

[52] U.S. Cl. .................... 343/106 D; 343/108 M
[51] Int. Cl.² ........................................... G01S 1/38
[58] Field of Search .................... 343/106 D, 108 M

[56] References Cited
UNITED STATES PATENTS
3,626,419  12/1971  Earp .............................. 343/106 D
3,670,338  6/1972  Earp .............................. 343/106 D Primary Examiner—Malcolm F. Hubler
Assistant Examiner—Richard E. Berger
Attorney, Agent, or Firm—William T. O'Neil

[57] ABSTRACT

A Doppler Navigation System having a frequency tracking arrangement such that the detector acceptance bandwidth can be narrow with respect to the entire spectrum of frequencies representative of a desired range of angular deviations within which the system is designed to operate. A tracking oscillator bears the received frequency spectrum to a modified spectrum center at a predetermined frequency F about which the two principal spectrum lines defining the Doppler frequency corresponding to the receiver angular position at any time are centered. A feedback control loop resembling AFC is employed.

5 Claims, 2 Drawing Figures

DOPPLER ILS RECEIVER

BACKGROUND OF THE INVENTION

1. Field of The Invention

This invention relates to radio directional guidance systems based on the Doppler principle.

2. Description of the Prior Art

Doppler radio navigation systems are well known per se and have previously been extensively described in the technical literature, including British Pat. Nos. 1,225,190 and 1,234,541. In those disclosures, a radio frequency source is commutated successively to the separate elements of a linear horizontal or vertical array of radiators in ground beacon arrangement, either to simulate uni-directional constant velocity motion of a single radiator, or to-and-fro constant velocity motion.

The bearing information derived in an airborne receiver in such a Doppler system does not consist of a pure sinusoid at the discrete information frequency, since due to the finite length of antenna scan, transients are introduced at the reset, (beginning and end of each scan). On a frequency basis it is accordingly required that the airborne receiver of the system interpret the center of a spectral distribution rather than a single spectral scan. This distribution may usually be of sin $x/x$.

Furthermore, as the scanning process is periodic this spectral distribution essentially contains specific spectral lines corresponding to harmonics of the scan rate.

In the receiver equipments described in the aforementioned British Patents, the spectral distribution containing lines which indicate the required bearing were accepted by a wideband filter fixed to cover the complete sector of frequencies corresponding to the range of possible bearings.

This acceptance by the detector of such a wide range of spectral components implies a wide band characteristic which also embraces noise and other unwanted components. In particular, multipath operation deteriorates due to acceptance of spectral line components derived from unwanted reflections, and centering errors are introduced due to asymmetrical truncation of wide spectra by filters.

Bearing extraction should be achieved on the narrowest bandwidth basis possible using the minimum number of line components compatible with effective bearing definition. The manner in which the present invention improves the operation of equipment of the character described in these respects will be evident, as this description proceeds.

SUMMARY OF THE INVENTION

According to the invention there is provided a receiver system for a radio guidance system as described, wherein means are included for changing the received bearing representing input signal frequency to a predetermined fixed frequency such that for all bearings the resulting spectrum containing its two most significant lines lies symmetrically spaced on each side of said predetermined frequency.

The center of the frequency distribution is defined by the comparison of two main spectral lines in the same way that an amplitude scanned system defines the position of the main beam by identifying two 3dB points symmetrically placed on each side of the beam maximum. In the Doppler system, the center of spectrum may be identified as midway between the two longest (greatest magnitude) spectral lines provided these are equal. In accordance with this approach, the need for a wide band airborne detector frequency acceptance is eliminated and the ground reflected components are readily excluded because of their inherent shifted relationship vis-a-vis the main spectral lines.

In the modified ground beacon array scanning program in which each up or down scan contains an odd number of quarter cycles there is no central spectral line but the envelope is defined by two equal lines spaced one-fourth beamwidth symmetrically from the center.

DESCRIPTION OF THE PREFERRED EMBODIMENT

Figure 1:
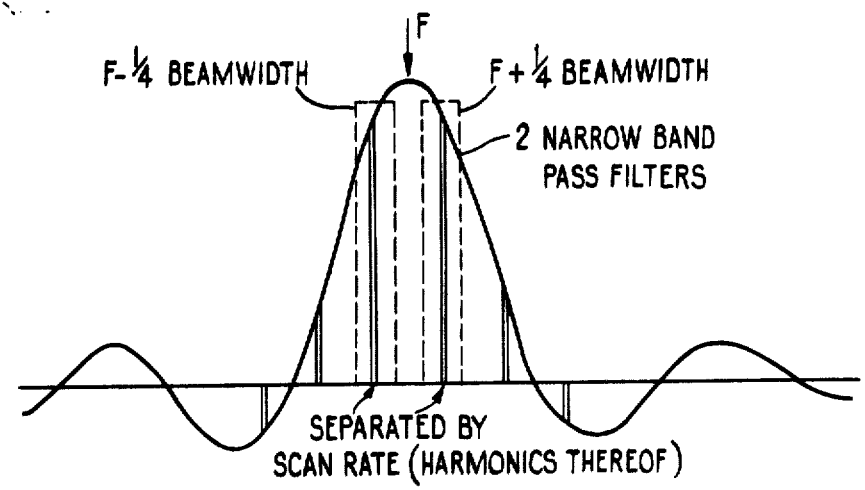
FIG. 1 shows the spectral envelope of the received bearing information signal brought to a predetermined fixed frequency in accordance with the invention.

Referring now to the drawings, the invention will be described in more detail.

The bearing input information signal, as received from an array of antenna elements as described, in which the radio frequency source is commutated successively to the separate elements of the array to simulate to-and-fro constant velocity motion (having a frequency within the range $f_1 \rightarrow f_2$ corresponding to the whole bearing range), is passed via a preliminary filter 1 (FIG. 2), which passes the total bearing frequency band but excludes certain unwanted frequencies widely separated in frequency, such as those arising from ground reflections in elevation applications, to a mixer 2 where the signal frequency is changed to a frequency $f_{mix}$ by beating with a variable frequency local oscillator VCO 3 whose output is fed to the mixer 2 via a reversible counter 4 (necessary to reverse the sense of oscillation frequency change in synchronism with the scan frequency of the transmitting array to preserve the "mirror image" position of the transient in the incoming spectrum) and a digital to analogue converter 5. The mixer output $f_{mix}$ is fed in parallel to a wide band discriminator 6, and also in parallel to the two narrow band filters 7 and 8.

The wide band discriminator 6 acts as a coarse control in a feedback loop to the oscillator 3 to vary its frequency such as to bring the frequency $f_{mix}$ towards a predetermined fixed frequency F. The two filters 7 and 8 are centered respectively on F + ¼ beamwidth and F − ¼ beamwidth, and their outputs are fed to a differential detector (averaging) 9. The frequency value of ¼ beamwidth will be appreciated from FIG. 1, wherein the relationship of F and the two filters 7 and 8 are depicted. As indicated by the block B, control of the oscillator VCO is effectively passed to the differential detector 9 where $f_{mix} = F \pm$ ¼ beamwidth, whereupon the oscillator frequency is finely controlled such that the information input signal is brought to the predetermined fixed frequency F with the resulting spectrum containing its two most powerful lines symmetrically spaced (and thus equal in amplitude) on each side of this frequency. The block B together with 12 form an electronic switch responsive to an output from 9 representing the near equality of filter outputs (7 and 8).

Said switch B is activated to connect 9 to 3, when the VCO frequency is such as to place said frequency F between the notches of filters 7 and 8. This equality of amplitude is detected by the averaging detector responding to the two filter outputs (7 and 8, by measuring the equality of power of the two spectral pairs. The required condition is maintained by controlling the frequency of the local oscillator in a closed loop configuration not unlike the so-called AFC (automatic frequency control) arrangement.

Figure 2:
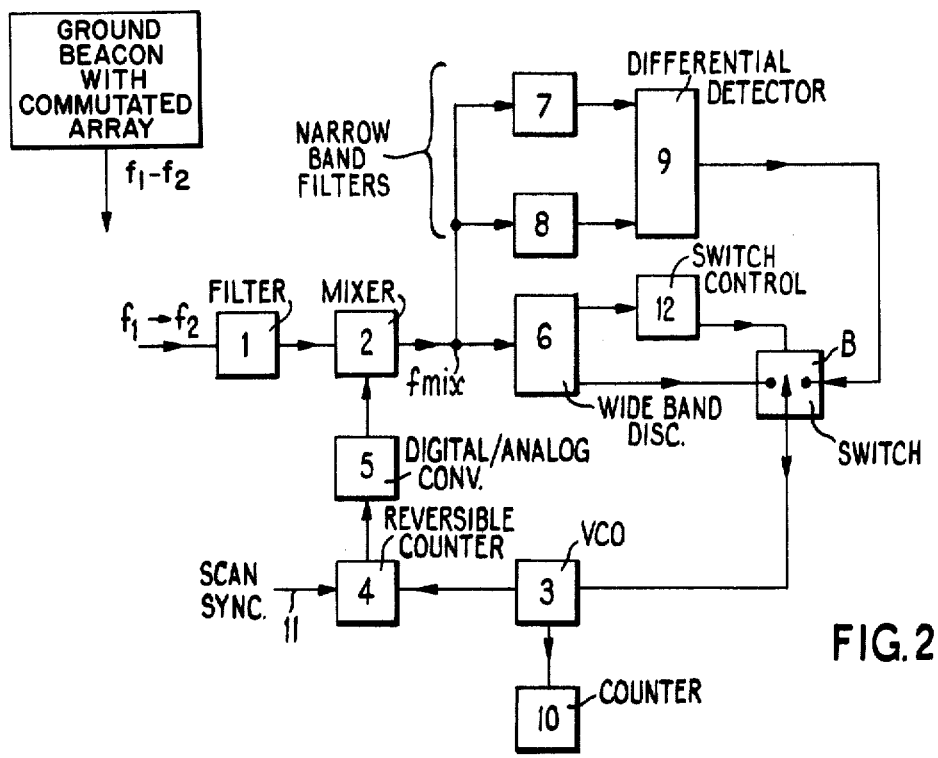
FIG. 2 is a block schematic diagram of the receiver embodying the invention.

It will be realized from FIGS. 1 and 2 that any variation in the desired relationship (F centered between the two main spectral lines at the F plus and minus the frequency equivalent of the quota beamwidth points) will cause a change in the output of detection 9 which will change the frequency of VCO 3 in a compensatory way to tend to "recenter". The differential detector 9 is a form of discriminator which provides a predetermined output level when the said two main spectrum lines bracket F accurately, and "skirts" so that the output of 9 will change in one sense for a given direction of "offcentering" of F, and in the opposite sense for offcentering in the other direction.

The "scan sync." input 11 is a control function normally derived from the ground beacon "reference" transmission in known forms of Doppler navigation systems. All types of these Doppler systems require knowledge at the airborne station of the beginning of a scan cycle and recognition of a change of commutation direction at the ground beacon array. In FIG. 2, this signal controls the reversible counter 4 to follow these reverses of ground array scan sense so that its count change after passing through the D to A converter 5, corresponds to the correct sense of frequency change to effect the centering control of F correctly for each direction of said ground array scan (commutation).

The local oscillator frequency itself thus can be directly measured to define the true signal center frequency indicating bearing or elevation angle, a counter 10, which may be calibrated in the angle of frequency, provides a read-out at the airborne receiver.

In this way the use of two very narrow band filters, e.g. each of one-tenth beamwidths, defines the center of a spectral frequency distribution with minimum bandwidth expenditure, thus excluding unwanted components to a great degree.

It is to be understood that the foregoing description of a specific embodiment of this invention is made by way of example only and is not to be considered as a limitation on its scope.

What is claimed is:

1. A Doppler navigation system including a ground beacon having an array of commutated antenna elements and at least one airborne receiver responsive to the radiation from said array to determine the angular position of said receiver with respect to said beacon, comprising:

first means within said receiver for determining a Doppler frequency signal representative of said angular position, said signal having a spectrum including two relatively large and substantially equal magnitude spectral lines;

and second means operatively associated with said first means, including means for frequency tracking said angle representing signal, said second means also including frequency conversion means responsive to a variable signal generated by said frequency tracking means and to said angle representing signal to produce an output signal within a fixed passband centered at a frequency midway between said two relatively large spectral lines representing said Doppler signal after conversion.

2. In a Doppler navigation system having a ground beacon array of commutated antenna elements successively excited from a radio frequency generator to simulate a moving source whereby an airborne receiver may determine its angular position as a function of a received Doppler frequency component of energy received from said commutated array, the combination comprising:

mixing means within said receiver for receiving energy transmitted from said beacon array, said energy occupying a spectrum including at least commutation reset transients, noise and a signal corresponding to the Doppler frequency analog of said angular position, said mixing means operating to convert the frequency band of said received energy to one centered on a fist predetermined frequency, said Doppler frequency analog signal being converted at the output of said mixing means to a pair of spectral lines symmetrically bracketing said first predetermined frequency;

and a frequency control loop including said mixing means, a signal controlled oscillator connected to act as a local oscillator for said mixer, and means responsive to the output of said mixer to develop a signal for controlling said oscillator to establish said first predetermined frequency substantially midway in frequency between the frequencies of said spectral lines.

3. Apparatus according to claim 2 in which said means responsive to the output of said mixer to develop a signal for controlling said oscillator to establish said first predetermined frequency comprises a pair of narrow band filters having passbands fixed, one on each side of said first predetermined frequency, and a differential detector responsive to the outputs of said narrow band filters to provide a feedback control signal to said oscillator as a function of the deviation of said mixer output band center compared to said first predetermined frequency.

4. Apparatus according to claim 3 including a wideband discriminator responsive to the output of said mixer, said discriminator providing a first output condition when said mixer output band center is spaced by an amount greater than a predetermined frequency increment from said first predetermined frequency and a second output condition when said mixer output band center is spaced by an amount less than said predetermined frequency increment from said predetermined frequency, and including electronic switch means responsive to said first and second output conditions to switch control of said oscillator from a frequency proportional output of said wideband discriminator whenever said first output condition is extant and to the output of said differential detector whenever said second output condition is extant.

5. Apparatus according to claim 2 including a bandpass filter ahead of the input to said mixer, said band pass filter diminishing multipath signals having frequencies falling outside the passband thereof, said passband being wide enough to accept signals corresponding to all useful angular positions of said receiver.

* * * * *